United States Patent Office 3,539,602
Patented Nov. 10, 1970

3,539,602
LYSINE DERIVATIVES
Albert Jöhl, Basel, Switzerland, Albert Hartmann, Grenzach, Germany, and Hans Rink, Riehen, Switzerland, assignors to Geigy Chemical Corporation, Ardsley, N.Y., a corporation of New York
No Drawing. Filed Apr. 18, 1967, Ser. No. 631,582
Claims priority, application Switzerland, Apr. 22, 1966, 5,875/66
Int. Cl. C07c *103/48, 103/84*
U.S. Cl. 260—404.5                 6 Claims

ABSTRACT OF THE DISCLOSURE

Lysine derivatives in which the carboxyl group in 1-position is esterified with an open chain aliphatic or an araliphatic, optionally substituted hydrocarbon radical and the amino group of which in 6-position is substituted by certain alkanoyl or chlorobenzoyl, phenylacetyl, phenoxyacetyl or phenylmercaptoacetyl radicals, as well as their acid addition salts with inorganic and organic acids, which novel compounds are useful in the treatment of allergic diseases of the connective tissue, and of wounds, because of their anti-allergic activity and their property of stimulating the metabolism of connective tissue; pharmaceutical compositions containing the aforesaid novel compounds as active ingredients; and methods for treatment of allergic diseases, diseases of the connective tissue, and wounds, by administration or application of the said novel compounds or novel compositions containing them.

FIELD OF THE INVENTION

The present invention concerns new lysine derivatives and acid-addition salts thereof, processes for the production thereof, pharmaceutical compositions which contain the new compounds as active ingredients, and methods for treatment of allergic diseases, diseases of the connective tissue, and wounds with the aid of the novel compounds and compositions containing them.

SUMMARY OF THE INVENTION

More particularly the invention provides, in a first aspect, novel lysine derivatives of the formula

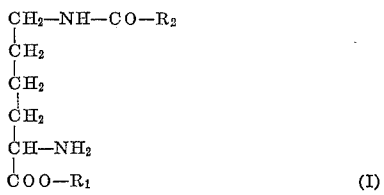

(I)

wherein $R_1$ represents an open chain aliphatic or araliphatic hydrocarbon radical optionally substituted by halogen up to the atomic number 35 and/or interrupted in a non-cyclic position by oxygen and/or sulphur, the hydrocarbon radical having at most 12 carbon atoms, and —CO—$R_2$ represents alkanoyl of from 2 to 12 carbon atoms, p-chlorobenzoyl, phenylacetyl, phenoxyacetyl or the phenylmercaptoacetyl radical, in their DL-, D- or L-form, as well as their acid addition salts with inorganic or organic acids, which novel compounds have antiallergic activity and stimulate the metabolism of connective tissue and, therefore, are useful, per se or as active ingredients in pharmaceutical compositions, for the treatment of allergic diseases and diseases of the connective tissue as well as for the treatment of wounds.

In another aspect, the invention provides pharmaceutical compositions containing an effective amount of a novel compound according to the invention and pharmaceutically acceptable carrier therefor, which carrier is compatible with such compound.

In a third aspect, the invention provides novel methods of treating allergic diseases, diseases of the connective tissue, or wounds, by administration or application of a lysine derivative according to the invention or a pharmaceutically acceptable salt thereof with an inorganic or organic acid, in effective amounts, either per se or in the form of pharmaceutical compositions according to the invention.

DETAILED DESCRIPTION OF THE INVENTION AND PREFERRED EMBODIMENTS THEREOF

In Formula I defining the new lysine derivatives according to the invention, $R_1$ as straight or branched, open-chain aliphatic radical can be, for example, the methyl, ethyl, propyl, isopropyl, butyl, sec.butyl, isobutyl, tert.butyl, pentyl, isopentyl, 1,2-dimethyl-propyl, etc. up to the dodecyl, and as araliphatic radical the benzyl, 2-phenethyl, 1- and 2-naphthylmethyl group.

To produce a compound according to the invention, a compound of the formula

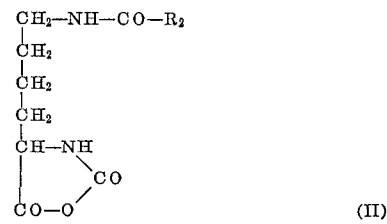

(II)

wherein —CO—$R_2$ has the meaning given in Formula I, is reacted with an aliphatic or araliphatic alcohol of the general formula

$$R_1\text{—OH} \qquad \text{(III)}$$

wherein $R_1$ has the meaning given in Formula I and, if desired, the ester obtained is converted into an addition salt with an inorganic or organic acid.

The reaction is preferably performed with the aid of a strong mineral acid such as hydrochloric acid or concentrated sulphuric acid. As solvent, excess alcohol and/or an inert solvent is used. Suitable inert solvents, are, e.g. hydrocarbons such as anhydrous benzene or toluene, or ether-type liquids such as dioxane or anhydrous diethyl ether.

Starting materials of the general Formula II are produced, for example, by reacting thionyl chloride with an $N^6$-acyl-$N^2$-benzyloxycarbonyl lysine in anhydrous diethyl ether. The reaction mixture is preferably reacted with an alcohol of the general Formula III without isolating the starting material, the anhydride. Examples of starting materials are compounds of the general Formula II, the radicals —CO—$R_2$ of which correspond to the groups listed in the definition of —CO—$R_2$ after Formula I.

In a second process for the production of a compound of general Formula I, an amino carboxylic acid of the general formula

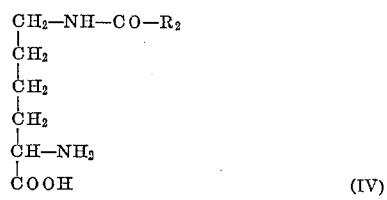

(IV)

wherein —CO—$R_2$ has the meaning given in Formula I, or a reactive derivative of such an acid, is modified in the known way into an aliphatic or araliphatic ester and, if desired, the ester obtained is converted into an addition salt with an inorganic or organic acid.

For example, an acid of the general Formula IV or a reactive functional derivative of such is reacted with an aliphatic or araliphatic alcohol of the general Formula III wherein $R_1$ has the meaning given in Formula I. This reaction of the free carboxylic acid is carried out, e.g. with the aid of a mineral acid such as hydrochloric acid or concentrated sulphuric acid, an aromatic sulphonic acid such as p-toluene or benzene sulphonic acid, or also thionyl chloride or sulphuryl chloride. As solvent, excess alcohol and/or an inert solvent is used. Suitable inert solvents are, e.g. hydrocarbons such as benzene or toluene, and also chlorinated hydrocarbons such as chloroform and carbon tetrachloride. If water is formed during the reaction, this is preferably removed by azeotropic distillation.

Instead of a free acid of the general Formula IV, also a low ester such as the methyl or ethyl ester can be reacted with an aliphatic or araliphatic alcohol of the general Formula III. This transesterification is preferably performed in excess alcohol in the presence of a catalyst such as sodium methylate or aluminium isopropylate.

Suitable starting materials of the general Formula III are, for example, those the radicals $R_1$ of which correspond to the groups explicitly listed at the end of Formula I.

In another variation of this process, an acid of the general Formula IV or a salt of such an acid is reacted with a reactive ester of an aliphatic or araliphatic alcohol of the general Formula III. As such salts, alkali metal salts such as sodium and potassium salts, or salts of organic bases such as pyridine, triethylamine or dicyclohexylethylamine are suitable, and, as reactive esters of alcohols of the general Formula III, halides such as bromides or chlorides, carboxylic acid esters such as acetates, sulphites, also sulphates, benzene or toluene sulphonic acid esters are suitable. Halides and sulphates are preferably reacted with the salts mentioned and acetates or sulphites are preferably reacted with the corresponding free acids of general Formula IV. The acetates and sulphites can be modified, e.g. with the aid of benzene or p-toluene sulphonic acid or perchloric acid.

In addition, an acid of the general Formula IV can be esterified with an alkylene or an arylalkylene which is disubstituted at a carbon bound by a double bond. The reaction is preformed, e.g. with the aid of a strong mineral acid such as concentrated sulphuric acid, in an inert solvent. Suitable solvents are, e.g. chlorinated hydrocarbons such as methylene chloride, glycols such as ethylene glycol, ether-type liquids such as dioxane or ethylene glycol dimethyl ether.

In addition an acid of general Formula IV can also be esterified with a diazo alkane or a diazo arylalkane. The reaction is preferably performed in a solvent. Suitable solvents are alkanols such as isopropanol or ether-type liquids such as diethyl eher or dioxane. Diazomethane and α-diazotoluene are mentioned as examples of diazo alkanes and diazo arylalkanes.

Suitable starting materials of the general Formula IV can be produced from lysine hydrochloride and the respective acyl chloride by converting the same with basic copper carbonate to copper lysinate and adding the desired acyl chloride while maintaining the reaction medium at an alkaline pH; the resulting copper complex is then demetallised, e.g. by refluxing with N,N,N',N'-ethylenediamine-tetraacetic acid or the like chelating agent.

Such suitable starting materials are, e.g. the known $N^6$-acetyl-L-lysine and $N^6$-phenylacetyl-L-lysine, furthermore, $N^6$-propionyl-L-lysine, $N^6$-hexanoyl-L-lysine, $N^6$-octanoyl-L-lysine, $N^6$-decanoyl-L-lysine, $N^6$-dodecanoyl-L-lysine, $N^6$-(p-chlorobenzoyl)-L-lysine, $N^6$-phenoxyacetyl-L-lysine and $N^6$-phenylmercaptoacetyl-L-lysine.

The compounds of general Formula I obtained by the processes according to the invention are then converted, if desired, into their addition salts with inorganic and organic bases. For example, the acid desired as salt component, or a solution thereof is added to a solution of a compound of general Formula I in an organic solvent such as methanol, ethanol, diethyl ether, chloroform or methylene chloride, and the salt which precipitates is isolated.

Instead of the free bases, acid addition salts can be used as medicaments, i.e. salts with those acids the anions of which are pharmaceutically acceptable in the usual dosages. Also it is of advantage if the salts to be used as medicaments crystallise well and are not or are only slightly hygroscopic. For salt formation with compounds of general Formula I, e.g. hydrochloric acid, hydrobromic acid, sulphuric acid, phosphoric acid, methane sulphonic acid, ethane sulphonic acid, β-hydroxyethane sulphonic acid, acetic acid, lactic acid, oxalic acid, succinic acid, fumaric acid, maleic acid, malic acid, tartaric acid, citric acid, benzoic acid, salicylic acid, phenylacetic acid, mandelic acid and embonic acid can be used as active substances instead of the free bases.

The new active substances are administered orally, rectally and parenterally. The daily dosages of the free bases or of pharmaceutically acceptable salts thereof vary between about 0.5 and about 160 mg./kg. bodyweight for adult mammals. Suitable dosage units such as dragées (sugar coated tablets), tablets, suppositories or ampoules, preferably contain 5–50 mg. of an active substance according to the invention or a pharmaceutically acceptable salt thereof.

Dosage units for oral administration preferably contain between 1% and 90% of a compound of general Formula I or a pharmaceutically acceptable salt thereof as active substance. The are produced, e.g. by combining the active substance with solid pulverulent carriers such as lacotose, saccharose, sorbitol, mannitol; starches such as potato starch, maize starch or amylopectin, also laminaria powder or citrus pulp powder; cellulose derivaties or gelatine, optionally with the addition of lubricants such as magnesium or calcium stearate or polyethylene glycols of suitable molecular weights, to form tablets or dragée cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coating, e.g. to distinguish between varying dosages of active substances.

Examples of dosage units for rectal administration are suppositories which consist of a combination of an active substance or a suitable salt thereof with a neutral fatty foundation, or also gelatine rectal capsules which contain a combination of the active substance or a suitable salt thereof with polyethylene glycols of suitable molecular weight.

Dry ampoules for the preparation of, preferably 0.5–5% aqueous solutions for parenteral, in particular intravenous, intramuscular or subcutaneous, administration, contain a water-soluble pharmaceutically acceptable salt of an ester of general Formula I, optionally together with suitable stabilising agents and buffer substances.

The following prescriptions further illustrate the production of tablets and dragées.

(a) 250 g. of $N^6$-(p-chlorobenzoyl)-L-lysine methyl ester hydrochloride are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicon dioxide are mixed in and the mixture is pressed into 10,000 tablets each weighing 100 mg. and containing 25 mg. of active substance (hydrochloride). If desired, the tablets can be grooved for better adaptation of the dosage.

(b) A granulate is produced from 250 g. of $N^6$-(p-chlorobenzoyl)-L-lysine sec.butyl ester hydrochloride, 175.90 g. of lactose and the alcoholic solution of 10 g. of stearic acid. After dying, the granulate is mixed with 56.60 g. of colloidal silicon dioxide, 165 g. of talcum, 20 g. of potato starch and 2.50 g. of magnesium stearate and the mixture is pressed into 10,000 dragée cores. These are then coated with a concentrated syrup made from 522.28 g. of crystallised saccharose, 6 g. of shellac, 10 g. of gum arabic, 215 g. of talcum, 15 g. of colloidal silicon dioxide, 0.22 g. of dyestuff and 1.5 g. of titanium dioxide and dried. The dragées obtained each weight 145 mg. and contain 25 mg. of active substance.

The following examples further illustrate the production of the new compounds of general Formula I and of hitherto undescribed intermediate products, but they in no way limit the scope of the invention. The temperatures are given in degrees centigrade.

EXAMPLE 1

1.04 ml. (14.4 mM.) of thionyl chloride are added dropwise to 12 ml. of methanol at $-10°$ with stirring. 2.26 g. (12.0 mM.) of $N^6$-acetyl-L-lysine are then added and the mixture is left to stand for 2 hours at 20° and for 18 hours at 50°. To work up, the reaction mixture is evaporated to dryness in vacuo. Sulphur dioxide and hydrochloric acid are removed by dissolving the resulting oily residue in methanol and evaporating the solution in vacuo. This evaporation process is repeated several times after the addition of methanol each time. The remaining oil is crystallised from methanol/acetone. The $N^6$-acetyl-L-lysine methyl ester hydrochloride obtained is very hygroscopic. In a sealed tube it sinters at 75° and decomposes at 80–83°; $[\alpha]_D^{23°}$, +17.2° (c.=2.05 in methanol); $[\alpha]_D^{23°}$, 13.1° (c.=1.92 in water).

The p-toluene sulphonate prepared in the usual manner melts, after crystallisation from methanol/ether at 122–123.5° with decomposition; $[\alpha]_D^{20°}$, +14.7 (c.=1.99 in ethanol); $[\alpha]_D^{21}$, +11.5° (c.=2.04 in water).

EXAMPLE 2

1.74 ml. (24.0 mM.) of thionyl chloride are added dropwise to 30 ml. of benzyl alcohol while stirring well at $-10°$. 2.26 g. (12.0 mM.) of $N^6$-acetyl-L-lysine are added and the mixture is kept for 34 hours at 30° and for 9 hours at 60°. After the addition of diethyl ether, the reaction mixture is extracted several times with water. 2.5 g. of sodium carbonate are added to the combined water extracts while cooling with ice and the base is extracted with diethyl ether. The ethereal solution is dried over sodium sulphate, concentrated in vacuo and treated with excess 1 N ethereal hydrogen chloride. The oily hydrochloride which separates is dissolved and re-precipitated twice from absolute diethyl ether/methanol and crystallised from ethanol/aceton. The $N^6$-acetyl-L-lysine benzyl ester hydrochloride obtained decomposes at 133–134°; $[\alpha]_D^{23°}$, −9.8° (c.=1.04 in water), $[\alpha]_D^{23°}$, −2.5° (c.=1.04 in ethanol).

EXAMPLE 3

(a) 18.3 ml. (250 mM.) of thionyl chloride are added dropwise at $-10°$ to 200 ml. (4.94 M) of methanol. 27.2 g. (100 mM.) of $N^6$-octanoyl-L-lysine are added to the stirred solution at $-10°$. The reaction mixture is left to reach room temperature within 1 hour, whereupon the starting material completely dissolves. The reaction solution is then heated for 4 hours at 40°. The methanol is then removed in vacuo; the oily residue is dissolved in methanol and the solution freed from hydrogen chloride and sulphur dioxide by evaporation in vacuo. The hydrochloride obtained is dissolved in 20 ml. of ice water and the pH of the aqueous solution is adjusted to 9.5 with 1 N sodium hydroxide solution while cooling with ice. The base is extracted with ethyl acetate, the ethyl acetate solution is washed with water and dried over sodium sulphate. After removal of the solvent in vacuo, the syrup which results is dissolved in 50 ml. of methanol and, while cooling with ice, 35 ml. of 3 N ethereal hydrochloric acid are added. The crude $N^6$-octanoyl-L-lysine methyl ester hydrochloride is precipitated by the addition of 400 ml. of diethyl ether. The crude product is purified by two crystallistaions from methanol/ethyl acetate/diethyl ether; M.P. 149–150°; $[\alpha]_D^{21°}$, +15.7° (c.=2.06 in methanol); $[\alpha]_D^{21°}$, 15.5° (c.=1.06 in water).

(b) $N^6$-octanoyl-L-lysine benzyl ester hydrochloride is produced analogously to Example 3(a) from $N^6$-octanoyl-L-lysine with benzyl alcohol. It melts at 144–145° from methanol/ethyl acetate/diethyl ether; $[\alpha]_D^{22°}$, −5.6° (c. =1.57 in water).

The starting material for Example 3(a) and 3(b), $N^6$-octanoyl-L-lysine, is obtained as follows:

(c) 55 g. of basic copper carbonate ($2CuCO_3$, $Cu(OH)_2$) are added to a solution of 54.8 g. (300 mM.) of L-lysine hydrochloride in 480 ml. of water and the mixture is boiled for 30 minutes. The excess copper carbonate is filtered off and washed with 80 ml. of water. The deep blue copper lysinate solution is cooled to 0° and 53.7 g. (330 mM.) of octanoyl chloride are added dropwise at 0° to +3° with stirring within 1 hour. The reaction mixture is stirred for another 6 hours at 0°, the pH being kept at 8 to 9 by the dropwise addition of 4 N sodium hydroxide solution. The copper complex of $N^6$-octanoyl-L-lysine which precipitates during the reaction is then filtered off, washed well with water and acetone and dried. To remove the copper, the copper complex is dissolved in 1000 ml. of 2 N hydrochloric acid and hydrogen sulphide is bubbled through the solution for 1 hour. The excess hydrogen sulphide is then removed by a vigorous stream of air. After removal of the precipitated copper sulphide, the pH of the solution is adjusted to 6 with concentrated ammonia whereupon the crude $N^6$-octanoyl-L-lysine precipitates. It is filtered off, washed with water and ethanol and crystallised twice from water/ethanol; M.P. 259–261° (decomposition); $[\alpha]_D^{22°}$, +17.1° (c. =0.94 in 2 N hydrochloric acid).

EXAMPLE 4

(a) 6.55 g. (55 mM.) of thionyl chloride are added dropwise at $-10°$ to 30 ml. of methanol. 13.2 g. (50 mM.) of $N^6$-phenylacetyl-L-lysine are added at $-10°$ to $-5°$ in small portions. The raction mixture is left to stand until the temperature has reached 20° and is then heated for 6 hours at 40°. The pale yellowish solution is concentrated in vacuo. To remove sulphur dioxide and excess hydrogen chloride, the residue is dissolved several times in methanol and diethyl ether and concentrated in vacuo. The remaining oil is triturated repeatedly with fresh methanol and diethyl ether until it crystallises. The resulting $N^6$-phenylacetyl-L-lysine methyl ester hydrochloride is washed with diethyl ether, dried in vacuo and recrystallised from methanol/ethyl acetate/diethyl ether, M.P. 125–126°; $[\alpha]_D^{22°}$, +16.8° (c.=2.03 in methanol).

EXAMPLE 5

A suspension of 13.2 g. (50 mM.) of $N^6$-phenylacetyl-L-lysine in a mixture of 100 ml. (970 mM.) of benzyl alcohol, 100 ml. of carbon tetrachloride and 8.7 g. (55 mM.) of benzene sulphonic acid is refluxed for 16 hours. During the reaction the resulting water is removed by continuous azeotropic distillation.

At the end of the reaction, the carbon tetrachloride is evaporated in vacuo and then the benzyl alcohol is distilled off under high vacuum. The remaining yellow oil is dissolved in 120 ml. of ice cold water, the pH of the solution is adjusted to 9 with 1 N sodium hydroxide solution at 0° and the solution is extracted 4 times in the cold with 150 ml. of ethyl acetate each time. The combined ethyl acetate extracts are washed three times with 40 ml. of ice water each time and dried over sodium sulphate. After removal of the solvent in vacuo, the resulting oil is dissolved in 20 ml. of methanol and 45 ml. of 1.21 N ethereal hydrochloric acid are added at 0°. The $N^6$-phenylacetyl-L-lysine benzyl ester hydrochloride is completely precipitated by the addition of 200 ml. of diethyl ether. The crude hydrochloride is purified by crystallisation from chloroform/ethyl acetate/diethyl ether and then crystallised from methanol/ethyl acetate/diethyl ether, M.P. 135–136°; $[\alpha]_D^{22}$, +4.0° (c.=2.07 in 1 N hydrochloric acid).

EXAMPLE 6

$N^6$-phenylacetyl-L-lysine sec.butyl ester hydrochloride, M.P. 136–137° (from methanol/acetone/diethyl ether); $[\alpha]_D^{22}$, +14.4° (c.=1.97 in methanol); $[\alpha]_D^{22}$, +15.4° (c.=1.03 in water), is obtained from $N^6$-phenylacetyl-L-lysine with sec.butanol analogously to Example 5.

EXAMPLE 7

(a) 250 ml. (6.2 M) of methanol are cooled to −10° and 18.3 ml. (250 mM.) of thionyl chloride are added dropwise at −10°. 28 g. (100 mM.) of finely pulverised $N^6$-phenoxyacetyl-L-lysine are added to this solution with vigorous stirring at −10°. The clear, colourless solution is allowed to rise to room temperature and is then heated for 5.5 hours at 40°. The solution is then concentrated in vacuo, the oily residue is repeatedly disolved in methanol and then evaporated to dryness under reduced pressure. The resulting oily hydrochloride is crystallised from methanol/ethyl acetate/diethyl ether. In order to purify the crude $N^6$-phenoxyacetyl-L-lysine methyl ester hydrochloride, 30 g. (90 mM.) of the hydrochloride are dissolved at 0° in 100 ml. of 1 N sodium hydroxide solution. The free base is extracted with ethyl acetate in the cold, the organic layer is washed with ice water and dried over sodium sulphate. The solution is concentrated to about 50 ml. in vacuo and the hydrochloride is precipitated by the addition of 35 ml. of 2 N ethereal hydrochloric acid at 0°. After crystallising it twice from methanol/ethyl acetate/diethyl ether, the $N^6$-phenoxyacetyl-L-lysine methyl ester hydrochloride melts at 123–125°; $[\alpha]_D^{23}$, +13.8° (c.=2.07 in methanol). The starting material, $N^6$-phenoxy-L-lysine, is produced as follows:

(b) 18.3 g. of basic copper carbonate ($2CuCO_3$, $Cu(OH)_2$) are added to a solution of 18.3 g. (100 mM.) of L-lysine hydrochloride in 80 ml. of water and refluxed for 30 minutes. The excess copper carbonate is removed by filtration, washed with water and the blue filtrate is cooled to 0° whereupon 25.6 g. (150 mM.) of phenoxyacetyl chloride are added dropwise within 3 hours with vigorous stirring at 0°. The pH is kept at 8.5 to 9 by the dropwise addition of 2 N sodium hydroxide solution. The precipitated copper complex of $N^6$-phenoxyacetyl-L-lysine is collected on a filter, washed well with water and acetone and dried.

30.5 g. of the finely pulverised copper complex are added to a boiling solution of 29.2 g. (100 mM.) of N,N,N′,N′-ethylenediamine tetraacetic acid in 125 ml. of water and 100 ml. of 2 N sodium hydroxide solution. A small amount of an insoluble side product is removed by filtration and the filtrate is permitted to cool in an ice bath. The precipitated, colourless $N^6$-phenoxyacetyl-L-lysine is filtered, washed with a little water and ethanol and dried in vacuo. A further amount of the compound can be obtained by concentrating the mother liquor. The crude product is crystallised from water/ethanol and melts at 230–231° with decomposition.

EXAMPLE 8

(a) 9.1 ml. (125 mM.) of thionyl chloride are added dropwise to 120 ml. (2.96 M) of methanol which has been cooled to −10°. 14.8 g. (50 mM.) of $N^6$-phenylmercaptoacetyl-L-lysine are added in portions to this solution at −10° with stirring. The solution is allowed to rise to room temperature and is then heated for 5.5 hours at 40°. The solvent is then evaporated in vacuo and, in order to completely remove hydrogen chloride and sulphur dioxide, the remaining oil is repeatedly dissolved in methanol and evaporated to dryness under reduced pressure. The syrupy residue is crystallised by treatment with diethyl ether. The crude $N^6$-phenylmercaptoacetyl-L-lysine methyl ester hydrochloride is recrystallised twice from methanol/ethyl acetate/diethyl ether, M.P. 161–163°; $[\alpha]_D^{23}$, +13.5° (c.=2.04 in water); $[\alpha]_D^{23}$, +14.5° (c.=2.0 in methanol).

The starting material, $N^6$-phenylmercaptoacetyl-L-lysine, is obtained as follows:

(b) 84 g. (460 mM.) of L-lysine hydrochloride are dissolved in 800 ml. of water, 84 g. of basic copper carbonate ($2CuCO_3$, $Cu(OH)_2$) are added and refluxed for 30 minutes. After removal of unchanged copper carbonate, 128 g. (690 mM.) of phenylmercapto acetyl chloride are added dropwise within 3 hours to the deep blue copper lysinate solution while stirring vigorously at 0°. Finally, the reaction mixture is stirred for 3 hours at 0°. During the reaction, the pH is kept at between 8.5 to 9 by the addition of 6 N sodium hydroxide solution. The fine, pale blue copper complex of $N^6$-phenylmercaptoacetyl-L-lysine which precipitates, is filtered, washed with water and acetone and dried.

110 g. of the copper complex are suspended in a mixture of 1600 ml. of water and 1600 ml. of ethanol and a solution of 60 g. (205 mM.) of N,N,N′,N′-ethylenediamine tetraacetic acid in 200 ml. of 2 N sodium hydroxide solution is added. The mixture is refluxed until a clear solution results. After filtration, the solution is cooled in an ice bath whereupon $N^6$-phenylmercaptoacetyl-L-lysine precipitates in the form of colourless crystals. The crude product is collected on a filter, washed with a mixture of water and ethanol (1:1) and dried. A further amount of the product can be obtained after concentration of the mother liquor. The $N^6$-phenylmercaptoacetyl-L-lysine is recrystallised from water/ethanol (1:1), M.P. 230–232° with decomposition; $[\alpha]_D^{23}$, 15.0° (c.=0.98 in 2 N hydrochloric acid).

EXAMPLE 9

(a) 6.92 ml. (96 mM.) of thionyl chloride are added dropwise to 100 ml. of absolute methanol at −10° with stirring, 22.8 g. (80 mM.) of $N^6$-(p-chlorobenzoyl)-L-lysine are added to the solution and the mixture is left to stand for 2 hours at 40° and for 12 hours at 20°. The solution is then concentrated in vacuo and freed from hydrogen chloride and sulphur dioxide by repeatedly dissolving the syrupy residue in methanol and evaporating the solution in vacuo. The residue crystallises upon treatment with diethyl ether. The crystals are filtered, washed with diethyl ether and dissolved in 100 ml. of water. The free base precipitates from this solution by adding 8.5 g. (80 mM.) of sodium carbonate in 100 ml. of water at 5–10°. It is extracted several times with diethyl ether. The ether extract is washed repeatedly with water, dried over sodium sulphate and concentrated in vacuo. It is precipitated from the concentrated solution in the form of the hydrochloride with excess 1 N ethereal hydrochloric acid. The $N^6$-(p-chlorobenzoyl)-L-lysine methyl ester hydrochloride is recrystallised from methanol/diethyl ether whereupon it decomposes at 190°. $[\alpha]_D^{22}$, +15.1° (c.=2.03 in methanol); $[\alpha]_D^{22}$, +17.2° (c.=2.02 in water).

The starting material, $N^6$-(p-chlorobenzoyl)-L-lysine is produced as follows:

(b) 35.0 g. (0.16 mol) of basic copper carbonate, $2CuCO_3$, $Cu(OH)_2$, are added to 18.0 g. (0.1 mol) of L-lysine hydrochloride dissolved in 400 ml. of water. The mixture is refluxed for 2 hours. The excess copper carbonate is removed from the blue solution of the resulting copper lysine complex. 26.2 g. (0.15 mol) of p-chlorobenzoyl chloride and 150 ml. of 2 N sodium hydroxide solution are added within 10 minutes to the vigorously stirred solution at 5°. The mixture is then stirred for another hour at 20° whereupon the precipitated copper complex is collected on a filter and washed with water.

The still moist powder is suspended in 330 ml of 2 N hydrochloric acid, the stirred mixture is heated for 30 minutes at 40°, then cooled to 20° and filtered. Hydrogen sulphide is passed into the filtrate for 30 minutes. The precipitated copper sulphide is filtered and washed with water. The pH of the filtrate is adjusted to 6 with 6 N sodium hydroxide solution at 10° whereupon $N^6$-(p-chlorobenzoyl)-L-lysine precipitates. The product is filtered, washed with water, recrystallised from ethanol/water and dried in vacuo at 60°. It decomposes at 255–260°. $[\alpha]_D^{22°}$, +23.1° (c.=2.02 in formic acid).

EXAMPLE 10

7.25 ml. (100 mM.) of thionyl chloride are added dropwise to 175 ml. of benzyl alcohol at −10° with stirring. 14.25 g. (50 mM.) of the $N^6$-(p-chlorobenzoyl)-L-lysine obtained according to Example 9(b) are added, the solution is heated for 17 hours at 50° and then left to stand for 24 hours at 20°. The solution is freed from sulphur dioxide and hydrogen chloride by evaporation under reduced pressure. The residue is dissolved in 500 ml. of diethyl ether and 200 ml. of water, both phases are well shaken and the small amount of precipitated $N^6$-(p-chlorobenzoyl)-L-lysine is removed by filtration. The ethereal phase is extracted 5 times with 50 ml. of water each time. The combined water extract is made alkaline at 5° with 100 ml. of 5% sodium carbonate solution and the base is extracted with 1 litre of diethyl ether. The ethereal solution is washed with water, dried over sodium sulphate and concentrated in vacuo. After the addition of 1 N ethereal hydrogen chloride, the $N^6$-(p-chlorobenzoyl)-L-lysine benzyl ester hydrochloride precipitates and is recrystallised from methanol/diethyl ether; it sinters at 180° and decomposes at 182–184°. $[\alpha]_D^{22°}$, −5.0° (c.=2.04 in water); $[\alpha]_D^{22°}$, −4.1° (c.=2.2 in ethanol).

EXAMPLE 11

19.0 g. (160 mM.) of thionyl chloride are added dropwise to 300 ml. of sec.butanol at −10°. 28.5 g. (100 mM.) of the $N^6$-(p-chlorobenzoyl)-L-lysine obtained according to Example 9(b) are then added in portions while stirring well at 20°. The mixture is heated for 70 hours at 50°. The solvent is then distilled off in vacuo. In order to remove the sulphur dioxide and excess hydrochloric acid, the residue is dissolved several times in acetone and evaporated in vacuo each time. The residue is then dissolved in 200 ml. of water and 16 g. (150 mM.) of sodium carbonate are added to the ice-cooled solution. The base is extracted from the aqueous phase with diethyl ether. A small amount of unreacted $N^6$-(p-chlorobenzoyl)-L-lysine which precipitates from the aqueous phase is filtered off. The organic phase is washed with water and dried over sodium sulphate. After concentrating the solution in vacuo, the $N^6$-(p-chlorobenzoyl)-L-lysine sec.butyl ester hydrochloride is precipitated by the addition of 35 ml. of 3 N ethereal hydrochloric acid and recrystallised twice from methanol/diethyl ether. The pure compound sinters at 182° and melts at 183.5–184.5° with decomposition. $[\alpha]_D^{20°}$, +10.3° (c.=2.07 in methanol); $[\alpha]_D^{20°}$, +16.2° (c.=2.03 in water).

EXAMPLE 12

27.5 g. (280 mM.) of concentrated sulphuric acid are added dropwise to 150 ml. of absolute dioxan at 10° with stirring. 18.3 g. (64 mM.) of the $N^6$-(p-chlorobenzoyl)-L-lysine obtained according to Example 9 and 150 ml. 1.59 mol) of liquid anhydrous isobutene are added in portions with stirring at 5°. The reaction vessel is immediately made gas-tight and vigorously shaken for 20 hours at room temperature. The mixture is cooled to 5° and then poured into 165 ml. of 4 N sodium hydroxide solution which has been cooled to 0°. The base is extracted from the aqueous phase with diethyl ether, the ether extract is washed with water and dried over sodium sulphate. The pH of the ethereal solution is adjusted to 5.0 by the addition of 2 N methanolic hydrochloric acid and, after evaporation of the solvent in vacuo, the $N^6$-(p-chlorobenzoyl)-L-lysine tert. butyl ester hydrochloride is crystallised by treatment with diethyl ether. The crude product is recrystallised twice from methanol/diethyl ether whereupon the pure hydrochloride sinters at 150.5° and melts at 151–152° with decomposition. $[\alpha]_D^{21°}$, +17.5° (c.=2.08 in water); $[\alpha]_D^{21°}$, +13.0° (c.=2.01 in methanol).

EXAMPLE 13

11.9 g. (100 mM.) of thionyl chloride are added dropwise to 165 ml. of dodecyl alcohol at 25. 14.3 g. (50 mM.) of the $N^6$-(p-chlorobenzoyl)-L-lysine obtained according to Example 9(b) are added in portions at 25° with stirring. The mixture is heated for 45 hours at 50°. After cooling, the crude $N^6$-(p-chlorobenzoyl)-L-lysine dodecyl ester hydrochloride is precipitated by the addition of 300 ml. of diethyl ether. It is purified by suspending the crude product in 300 ml. of water and adding 10 g. (94 mM.) of sodium carbonate at 0°. The base is extracted from the aqueous solution with diethyl ether. The organic phase is washed with water and dried over sodium sulphate. After concentrating the ethereal solution in vacuo, the hydrochloride is precipitated by the addition of 20 ml. of 3 N ethereal hydrochloric acid. The crude product is recrystallised twice from water and dried for 15 hours under high vacuum at 40° whereupon it sinters at 150° and melts at 150.5–151.5° with decomposition. $[\alpha]_D^{22°}$, +5.9° (c.=1.98 in methanol).

EXAMPLE 14

28.5 g. (0.1 mol) of $N^6$-(p-chlorobenzoyl)-L-lysine (preparation see Example 9(b)) are suspended in 750 ml. of absolute dioxan and heated to 40°. Phosgene is bubbled into this suspension until a clear solution results. A vigorous stream of air is then blown for 10 to 12 hours through the solution in order to eliminate all the gases dissolved therein. This solution, now containing the $N^6$-(p-chlorobenzoyl)-L-lysine-$N^2$-carboxyanhydride is then concentrated in vacuo to a volume of about 100 ml. A solution of 74 ml. of 1.5 N hydrogen chloride in methanol is then added at room temperature within 30 minutes and the whole is then left to stand at room temperature for 20 hours. The solution is then evaporated to dryness and the oily residue is dissolved in methanol. The crude $N^6$-(p-chlorobenzoyl)-L-lysine methyl ester hydrochloride crystallises from this solution after the addition of diethyl ether. The crystals are removed by filtration and well washed with diethyl ether. The crude product is then dissolved in 100 ml. of ice-cold water and a solution of 10.6 g. of sodium carbonate in 100 ml. of water is added thereto. The free base is extracted with diethyl ether and the ethereal extracts are washed several times with water, dried over sodium sulphate, concentrated in vacuo and treated with 44 ml. of a 2.5 N ethereal hydrogen chloride solution, whereupon $N^6$-(p-chlorobenzoyl)-L-lysine-methyl ester hydrochloride crystallises. It is filtered and recrystallised from methanol/diethyl ether for further purification. The so obtained crystals melt at 190° (decomposition); $[\alpha]_D^{22°}$, +15.1° (c.=2.03 in methanol); $[\alpha]_D^{22°}$, +17.1° (c.=2.02 in water).

We claim:
1. A compound selected from
(a) a lysine derivative of the formula

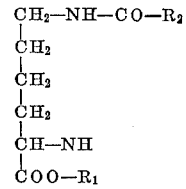

wherein $R_1$ is alkyl having 1 to 12 carbon atoms or phenyl lower alkyl and —CO—$R_2$ is alkanoyl of from 2 to 12 carbon atoms, p-chlorobenzoyl, phenylacetyl, phenoxyacetyl or phenylmercaptoacetyl, and
(b) the pharmaceutically acceptable acid addition salts of said lysine derivative.

2. A compound as defined in claim 1, wherein said lysine derivative is $N^6$-(p-chlorobenzoyl)-L-lysine methyl ester.

3. A compound as defined in claim 1, which is $N^6$-(p-chlorobenzoyl)-L-lysine methyl ester hydrochloride.

4. A compound as defined in claim 1, wherein said lysine derivative is $N^6$-(p-chlorobenzoyl)-L-lysine sec.-butyl ester.

5. A compound as defined in claim 1, wherein said lysine derivative is $N^6$-(p-chlorobenzoyl)-L-lysine tert.-butyl ester.

6. A compound as defined in claim 1, wherein said lysine derivative is $N^6$-octanoyl-L-lysine methyl ester.

References Cited

Ledger, R., Chemical Abstracts, vol. 63 (1965), pages 10056H to 10057C relied on.

Rothstein, M., Chemical Abstracts, vol. 63 (1965), page 8771A and B relied on.

LORRAINE A. WEINBERGER, Primary Examiner

L. A. THAXTON, Assistant Examiner

U.S. Cl. X.R.

260—470, 471, 482; 424—309, 312